United States Patent
Malur Srinivasan et al.

(10) Patent No.: US 11,869,128 B2
(45) Date of Patent: Jan. 9, 2024

(54) IMAGE GENERATION BASED ON ETHICAL VIEWPOINTS

(71) Applicant: FUJITSU LIMITED, Kawasaki (JP)

(72) Inventors: Ramya Malur Srinivasan, San Diego, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 220 days.

(21) Appl. No.: 17/644,128

(22) Filed: Dec. 14, 2021

(65) Prior Publication Data
US 2023/0186535 A1 Jun. 15, 2023

(51) Int. Cl.
| | | |
|---|---|---|
| G06T 11/60 | (2006.01) | |
| G06F 40/247 | (2020.01) | |
| G06N 3/045 | (2023.01) | |
| G06T 11/00 | (2006.01) | |
| G06F 40/30 | (2020.01) | |

(52) U.S. Cl.
CPC ............ *G06T 11/60* (2013.01); *G06F 40/247* (2020.01); *G06N 3/045* (2023.01); *G06F 40/30* (2020.01); *G06T 11/00* (2013.01); *G06T 2200/24* (2013.01)

(58) Field of Classification Search
CPC ..... G06T 11/60; G06T 2200/24; G06T 11/00; G06F 40/247; G06F 40/30; G06N 3/045
See application file for complete search history.

(56) References Cited

U.S. PATENT DOCUMENTS

| | | | |
|---|---|---|---|
| 11,645,479 B1* | 5/2023 | Coursey | G06F 40/58 704/9 |
| 2016/0062969 A1 | 3/2016 | Mengle et al. | |
| 2018/0293313 A1* | 10/2018 | Hauptmann | G06F 16/7837 |
| 2019/0034589 A1* | 1/2019 | Chen | G16H 50/30 |
| 2019/0087726 A1* | 3/2019 | Greenblatt | G06N 3/08 |
| 2019/0147371 A1* | 5/2019 | Deo | G06N 20/20 706/12 |
| 2020/0034427 A1* | 1/2020 | Ferrucci | G06N 20/00 |
| 2020/0242444 A1* | 7/2020 | Zhang | G06F 16/367 |

(Continued)

OTHER PUBLICATIONS

Waheeb et al, Machine Learning Based Sentiment Text Classification for Evaluating Treatment Quality of Discharge Summary—2020—mdpi (Year: 2020).*

(Continued)

*Primary Examiner* — YuJang Tswei
(74) *Attorney, Agent, or Firm* — Fujitsu Intellectual Property Center

(57) ABSTRACT

In an embodiment, a textual description of a situation of a first user is received. A first set of vector embeddings is determined based on the textual description. A set of ethical texts is received based on an input from a second user. A second set of vector embeddings is determined based on the set of ethical texts. A set of antonym words and a set of synonym words are determined with respect to the first set of vector embeddings, based on the second set of vector embeddings. A set of sentences is determined based on the set of antonym words and the set of synonym words. A first sentence is selected from the set of sentences based on parts-of-speech in each sentence. By using a GAN model, an image is generated based on the first sentence. The image is rendered on a display device associated with the second user.

20 Claims, 5 Drawing Sheets

(56) References Cited

U.S. PATENT DOCUMENTS

2020/0327327 A1* 10/2020 Wu .................. G06N 20/10
2020/0410721 A1   12/2020 Farri et al.
2021/0304854 A1*  9/2021 Lee .................. G06N 3/045

OTHER PUBLICATIONS

Fesseha-Text Classification Based on Convolutional Neural Networks and Word Embedding for Low-Resource Languages Tigrinya—2021—MDPI (Year: 2021).*
Tomas Mikolov, et al., "Efficient Estimation of Word Representations in Vector Space", arXiv:1301.3781v3 [cs.CL] Sep. 7, 2013, 12 pages, obtained from https://arxiv.org/pdf/1301.3781.pdf.
The Stanford Natural Language Processing Group, Software (/software/)> Stanford Log-linear Part-Of-Speech Tagger, 7 pages, obtained from https://nlp.stanford.edu/software/tagger.shtml.
Aditya Ramesh, et al., "Zero-Shot Text-to-Image Generation", arXiv:2102.12092v2 [cs.CV] Feb. 26, 2021, 20 pages, obtained from https://arxiv.org/pdf/2102.12092v2.pdf.
Emily Denton, et al., "Deep Generative Image Models using a Laplacian Pyramid of Adversarial Networks", arXiv:1506.05751v1 [cs.CV] Jun. 18, 2015, 10 pages, obtained from https://arxiv.org/abs/1506.05751.
Alec Radford, et al., "Unsupervised Representation Learning with Deep Convolutional Generative Adversarial Networks", arXiv:1511.06434v2 [cs.LG] Jan. 7, 2016, 16 pages, obtained from https://arxiv.org/abs/1511.06434.
Xi Chen, et al., "InfoGAN: Interpretable Representation Learning by Information Maximizing Generative Adversarial Nets", arXiv:1606.03657v1 [cs.LG] Jun. 12, 2016, 14 pages, obtained from https://arxiv.org/abs/1606.03657.
Scott Reed, et al., "Generative Adversarial Text to Image Synthesis", arXiv:1605.05396v2 [cs.NE] Jun. 5, 2016, 10 pages, obtained from https://arxiv.org/abs/1605.05396.
David Lopez-Paz, et al., "Revisiting Classifier Two-Sample Tests for GAN Evaluation and Causal Discovery", Oct. 16, 2016, 14 pages, obtained from https://research.fb.com/wp-content/uploads/2017/04/neural_tests.pdf.
Tim Salimans, et al., "Improved Techniques for Training GANs", arXiv:1606.03498v1 [cs.LG] Jun. 10, 2016, 10 pages, obtained from https://arxiv.org/abs/1606.03498.
Jianwei Yang, et al., "LR-GAN: Layered Recursive Generative Adversarial Networks for Image Generation", arXiv:1703.01560v3 [cs.CV] Aug. 2, 2017, 21 pages, obtained from https://arxiv.org/abs/1703.01560.
Swaminathan Gurumurthy, et al., arXiv:1706.02071v1 [cs.CV] Jun. 7, 2017, 9 pages, obtained from https://arxiv.org/abs/1706.02071.
Diederik P. Kingma, et al., "Auto-Encoding Variational Bayes", arXiv:1312.6114v10 [stat.ML] May 1, 2014, 14 pages, obtained from https://arxiv.org/abs/1312.6114.

Ian J. Goodfellow, et al., "Generative Adversarial Nets", arXiv:1406.2661v1 [stat.ML] Jun. 10, 2014, 9 pages, obtained from https://arxiv.org/abs/1406.2661.
Mehdi Mirza, et al., "Conditional Generative Adversarial Nets", arXiv:1411.1784v1 [cs.LG] Nov. 6, 2014, 7 pages, obtained from https://arxiv.org/abs/1411.1784.
Kihyuk Sohn, et al., "Learning Structured Output Representation using Deep Conditional Generative Models", 2015, 9 pages, obtained from https://papers.nips.cc/paper/2015/file/8d55a249e6baa5c06772297520da2051-Paper.pdf.
Jun-Yan Zhu, et al., "Unpaired Image-to-Image Translation using Cycle-Consistent Adversarial Networks", arXiv:1703.10593v7 [cs.CV] Aug. 24, 2020, 18 pages, obtained from https://arxiv.org/abs/1703.10593.
Benjamin Fish, et al., "Reflexive Design for Fairness and Other Human Values in Formal Models", Fourth AAAI/ACM Conference on Artificial Intelligence, Ethics, and Society, A virtual conference, May 19-21, 2021, date unknown, 1 page, obtained from https://www.aies-conference.com/2021/wp-content/posters/173_%20Reflexive%20Design%20for%20Fairness%20and%20Other%20Human%20Values%20in%20Formal%20Models.pdf.
Maureen Miner, et al., "Moral Theory in Ethical Decision Making: Problems, Clarifications and Recommendations from a Psychological Perspective" Journal of Business Ethics 42, 2003, Abstract only, 1 page, obtained from https://link.springer.com/article/10.1023/A:1021654015232#Abs1.
Marco Tulio Ribeiro, et al., ""Why Should I Trust You?" Explaining the Predictions of Any Classifier", KDD, 2016, 10 pages, obtained from https://www.kdd.org/kdd2016/papers/files/rfp0573-ribeiroA.pdf.
Abhineet Pandey et al: "This Explains That: Congruent Image-Report Generation for Explainable Medical Image Analysis with Cyclic Generative Adversarial Networks", Sep. 21, 2021 (Sep. 21, 2021), 16th European Conference—Computer Vision—ECCV 2020, Cornell University Library, 201 Olin Library Cornell University Ithaca, NY 14853, pp. 34-43, XP047610323.
Sheikh Hasan et al: "Complex Question Answering: Minimizing the Gaps and Beyond", Dissertation Abstracts International, Jun. 4, 2014 (Jun. 4, 2014), XP055473612,Retrieved from the Internet: URL:https://opus.uleth.ca/items/3a879cf0-d9e7-4eac-93ea-1da792551b40/full [retrieved on May 8, 2023].
Andrew K Lampinen et al: "One-shot and few-shot learning of word embeddings", arxiv.org, Cornell University Library, 201 Olin Library Cornell University Ithaca, NY 14853, Oct. 27, 2017 (Oct. 27, 2017), XP081307774.
European Patent Office, Extended European Search Report [EESR] dated May 16, 2023, in connection with counterpart Application No. 22 19 9986. *reference D5 (Reed et al) cited in the EESR has already been made of record in this US application*.

* cited by examiner ated image generation based on ethical viewpoints.

IMAGE GENERATION BASED ON ETHICAL VIEWPOINTS

FIELD

The embodiments discussed in the present disclosure are related image generation based on ethical viewpoints.

BACKGROUND

Advancements in the field of machine learning and Artificial Intelligent (AI) have led to development of numerous machine learning and AI-based decisioning tools. Such tools may be used by various institutions to take decisions related to evaluation of various types of applications or requests associated with a person. An example of such application or request associated with the person may include, but is not limited to, a loan application. However, certain machine learning and AI-based tools may be biased in decision making. For example, certain tools may be biased based on a gender (or age, race, or caste) of the person.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations, which may include receiving a first textual description associated with a situation of a first user. The set of operations may further include determining a first set of vector embeddings, based on the received first textual description. The set of operations may further include receiving a first set of ethical texts, based on a first user-input from a second user different from the first user. The set of operations may further include determining a second set of vector embeddings, based on the received first set of ethical texts. The set of operations may further include determining a first set of antonym words and a second set of synonym words with respect to the determined first set of vector embeddings, based on the determined second set of vector embeddings. The set of operations may further include determining a set of sentences, based on the determined first set of antonym words and the determined second set of synonym words. The set of operations may further include selecting a first sentence from the determined set of sentences, based on parts-of-speech included in each of the determined set of sentences. The set of operations may further include generating, by a Generative Adversarial Network (GAN) model, a first image based on the selected first sentence. The set of operations may further include rendering the generated first image on a display device associated with the second user.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
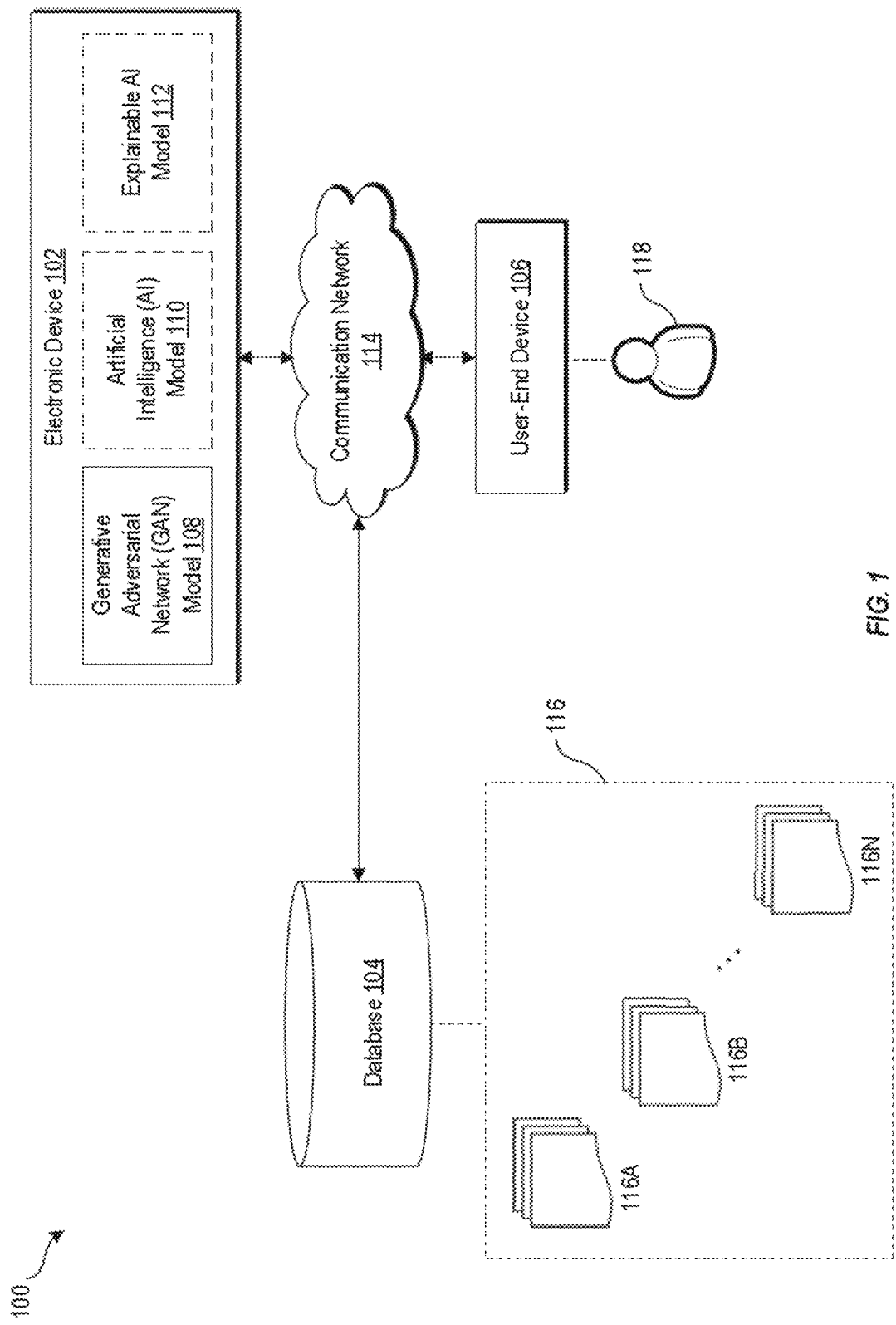
FIG. 1 is a diagram representing an example environment related to image generation based on ethical viewpoints.

Some embodiments described in the present disclosure relate to methods and systems for image generation based on ethical viewpoints. In the present disclosure, a first textual description associated with a situation of a first user may be received. A first set of vector embeddings may be determined, based on the received first textual description. Further, a first set of ethical texts may be received, based on a first user-input from a second user different from the first user. Thereafter, a second set of vector embeddings may be determined, based on the received first set of ethical texts. A first set of antonym words and a second set of synonym words with respect to the determined first set of vector embeddings may be determined based on the determined second set of vector embeddings. Thereafter, a set of sentences may be determined, based on the determined first set of antonym words and the determined second set of synonym words. A first sentence may be selected from the determined set of sentences, based on parts-of-speech included in each of the determined set of sentences. Thereafter, a first image may be generated by a Generative Adversarial Network (GAN) model, based on the selected first sentence. The generated first image may be rendered on a display device associated with the second user.

According to one or more embodiments of the present disclosure, the technological field of Artificial Intelligence (AI) models may be improved by configuring a computing system in a manner that the computing system may be able to generate an image for a situation of a first user based on ethical texts. Herein, the situation of the first user may be evaluated by an AI to provide an AI-decision associated with a first request of the first user. The computing system may receive a textual description associated with the situation of the first user and determine a first set of vector embeddings based on the received textual description. Based on a user input from a second user, the computing system may receive a set of ethical texts and determine a second set of vector embeddings based on the received set of ethical texts. Herein, the received set of ethical texts may be associated with an ethical viewpoint. The computing system may determine a first set of antonym words and a second set of synonym words with respect to the determined first set of vector embeddings, based on the determined second set of vector embeddings. Herein, antonyms and synonyms between vector embeddings of the textual description of the situation and the received set of ethical texts may include a set of relevant words that may capture a context with respect to the textual description and the received set of ethical texts. The computing system may determine a set of sentences based on the determined first set of antonym words and the determined second set of synonym words. From the determined set of sentences, the computing system may select a first sentence, based on parts-of-speech included in each of the determined set of sentences. The first sentence, that may be selected based on the parts-of-speech, may be a sentence that may have a broadest context among the determined set of sentences. Based on the selected first sentence, the computing system may determine a first image by use of a GAN model. Thereafter, the computing system may render the generated first image on a display device associated with the second user. As the first image may be generated based on the selected first sentence, therefore, the generated first image may be associated with the broadest context associated with textual description and the ethical viewpoint associated with the set of ethical texts. Such first image may be useful to visualize the situation of the first user, explanations of an AI decision, a consequence of the AI decision, or a desirable ethical value corresponding to the situation of the first user.

Typically, conventional systems may provide a textual explanation of an AI decision. Such textual explanation may not be impactful and may not consider ethical viewpoints associated with the situation of the first user. Certain conventional systems may provide visualizations of an AI decision. However, such visualizations may not be intuitive and may not be understandable by non-technical users. Also, such visualizations may not help trigger empathy. The disclosed system, on the other hand, may generate an image (such as, the first image) that may represent the broadest context associated with the situation of the first user, the explanation of the AI decision, the consequence of the AI decision, or the desirable ethical value corresponding to the situation of the first user. The presentation of such generated image to relevant stakeholders (such as, AI designers, programmers, and decision-makers in an organization) may trigger empathy towards the first user, elucidate different ethical viewpoints, and also enhance a diversity and inclusion in the AI-based decision-making process.

Embodiments of the present disclosure are explained with reference to the accompanying drawings.

FIG. 1 is a diagram representing an example environment related to image generation based on ethical viewpoints, arranged in accordance with at least one embodiment described in the present disclosure. With reference to FIG. 1, there is shown an environment 100. The environment 100 may include an electronic device 102, a database 104, a user-end device 106, and a communication network 114. The electronic device 102, the database 104, and the user-end device 106 may be communicatively coupled to one another, via the communication network 114. The electronic device 102 may include a Generative Adversarial Network (GAN) model 108, an Artificial Intelligence (AI) model 110, and an explainable AI model 112 that may correspond to the AI model 110. In FIG. 1, there is further shown a user 118, who may be associated with or operate the electronic device 102 or the user-end device 106. There is further shown a first set of ethical texts 116 including a first ethical text 116A, a second ethical text 116B, . . . and a Nth ethical text 116N. The first set of ethical texts 116 may be stored in the database 104.

The N number of ethical texts shown in FIG. 1 is presented merely as an example. The first set of ethical texts 116 may include only one or more than N ethical texts, without deviation from the scope of the disclosure. For the sake of brevity, only N ethical texts have been shown in FIG. 1. However, in some embodiments, there may be more than N ethical texts, without limiting the scope of the disclosure.

Though the AI model 110 and the explainable AI model 112 are shown as included or stored on the electronic device 102, in an embodiment, the AI model 110 and/or the explainable AI model 112 may be deployed or stored on separate devices, such as, a server (not shown in FIG. 1), the database 104, or the user-end device 106, without departure from the scope of the disclosure.

The electronic device 102 may include suitable logic, circuitry, interfaces, and/or code that may be configured to generate a first image based on a first textual description associated with a situation of a first user and a first set of ethical texts (e.g., the first set of ethical texts 116), as described herein.

The electronic device 102 may be configured to receive the first textual description associated with the situation of the first user. The first textual description may include information about a first decision made by the AI model 110, information about a first reason associated with the first decision, and information about a first set of ethical conditions on which the AI model 110 may be trained to make the first decision. The first decision may be associated with a first request of the first user. The information about the first reason may be received from the explainable AI model 112. The reception of the first textual description is described further, for example, in FIGS. 3 and 4.

The electronic device 102 may be configured to determine a first set of vector embeddings based on the received first textual description. In an example, the first set of vector embeddings may be determined using a one-hot vector-embedding technique. The electronic device 102 may be further configured to receive the first set of ethical texts 116 based on a first user-input from a second user different from the first user. The first set of ethical texts may correspond to one or more of, but not limited to, a set of consequentialism-based ethical texts, a set of deontological-based ethical texts, a set of situational-based ethical texts, a set of subjectivism-based ethical texts, a set of virtue-based ethical texts, a set of intuitionism-based ethical texts, or a set of utilitarian-based ethical texts. The electronic device 102 may be configured to determine a second set of vector embeddings based on the received first set of ethical texts 116. In an embodiment, the electronic device 102 may select one or more ethical texts from the received first set of ethical texts 116 based on a second user-input from the second user. In such case, the electronic device 102 may determine the second set of vector embeddings based on the selected one or more ethical texts. The determination of the first set of vector embeddings is described further, for example, in FIG. 3. The determination of the second set of vector embeddings is described further, for example, in FIGS. 3 and 5.

The electronic device 102 may be configured to determine a first set of antonym words and a second set of synonym words with respect to the determined first set of vector embeddings, based on the determined second set of vector embeddings. Further, the electronic device 102 may be configured to determine a set of sentences based on the determined first set of antonym words and the determined second set of synonym words. The determination of the first set of antonym words, the second set of synonym words, and the set of sentences are described further, for example, in FIG. 3.

The electronic device 102 may be configured to select a first sentence from the determined set of sentences based on parts-of-speech included in each of the determined set of sentences. The selected first sentence may correspond to a first ethical condition, which may be different from a second ethical condition corresponding to the received first textual description. For example, the electronic device 102 may identify the parts-of-speech included in each of the determined set of sentences. Further, the electronic device 102 may determine a diversity score associated with each of the determined set of sentences based on a count of the identified parts-of-speech included in each of the determined set of sentences. Thereafter, the electronic device 102 may select the first sentence from the determined set of sentences based on the determined diversity score associated with each of the determined set of sentences. In another example, the selection of the first sentence from the determined set of sentences may be further based on a third user-input from the second user. The selection of the first sentence from the determined set of sentences is described further, for example, in FIGS. 3 and 6.

The electronic device 102 may be configured to generate, by the GAN model 108, the first image based on the selected first sentence. In an example, the GAN model 108 may correspond to a zero-shot text-to-image converter model. The generated first image may be representative of one or more of, but not limited to, the situation of the first user, a consequence of a decision corresponding to a request of the first user, or a desirable ethical value corresponding to the situation of the first user. The electronic device 102 may be further configured to render the generated first image on a display device associated with the second user. For example, the generated first image may be rendered on a display device (such as, a display device 212 of FIG. 2) of the electronic device 102 or a display device of the user-end device 106. Examples of the generated images for exemplary conditions of a user are provided in FIGS. 7A, 7B, and 7C.

Examples of the electronic device 102 may include, but are not limited to, a recruitment engine or machine, a mobile device, a desktop computer, a laptop, a computer workstation, a computing device, a mainframe machine, a server, such as a cloud server, and a group of servers. In one or more embodiments, the electronic device 102 may include a user-end terminal device and a server communicatively coupled to the user-end terminal device. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

The database 104 may include suitable logic, interfaces, and/or code that may be configured to store the first set of ethical texts 116. In certain embodiments, the database 104 may further store the GAN model 108, the AI model 110, and/or the explainable AI model 112. In another embodiment, the database 104 may further store a dataset (e.g., training dataset or test dataset) associated with at least one of the GAN model 108, the AI model 110, or the explainable AI model 112. The database 104 may be derived from data off a relational or non-relational database, or a set of comma-separated values (csv) files in a conventional or a big-data storage.

The database 104 may be stored or cached on a device, such as a server or the electronic device 102. The device storing the database 104 may be configured to receive a query for first set of ethical texts 116 from the electronic device 102. In response, the device of the database 104 may be configured to retrieve and provide the queried first set of ethical texts 116 to the electronic device 102, based on the received query. In some embodiments, the database 104 may be hosted on a plurality of servers at same or different locations. The operations of the database 104 may be executed using hardware including a processor, a microprocessor (e.g., to perform or control performance of one or more operations), a field-programmable gate array (FPGA), or an application-specific integrated circuit (ASIC). In some other instances, the database 104 may be implemented using software.

The user-end device 106 may include suitable logic, circuitry, interfaces, and/or code that may be configured to render the first image generated by the GAN model 108. For example, the user-end device 106 may include a web-client software or an electronic mail software, through which the user-end device 106 may receive the first textual description. Additionally, or alternatively, the user-end device 106 may include a text editor software or a word processor software that may be used to generate or edit the first textual description, based on a user input from the user 118. The user-end device 106 may upload the generated, edited, or received first textual description to the electronic device 102. In addition, the user-end device 106 may upload the first set of ethical texts 116 to the database 104 for storage. In an embodiment, the user-end device 106 may receive a query from the user 118 to generate the first image. The user-end device 106 may further send the query to the electronic device 102 and initiate the generation of the first image. The user-end device 106 may receive the generated first image from the electronic device 102 and may render the received first image on a display device of the user-end device 106 to display the received first image to the second user (e.g., the user 118). Examples of the user-end device 106 may include, but are not limited to, a mobile device, a desktop computer, a laptop, a computer workstation, a computing device, a mainframe machine, a server, such as a cloud server, and a group of servers. Although in FIG. 1, the user-end device 106 is separated from the electronic device 102; however, in some embodiments, the user-end device 106 may be integrated in the electronic device 102, without deviation from the scope of the disclosure.

The GAN model 108 may include a first neural network model (also referred as a generator model) and a second neural network model (also referred as a discriminator model). The goal of the generator model may be to output a random variable that may emulate a target distribution. The goal of the discriminator model may be to classify an input random variable into a first category that may indicate that the input random variable may belong to the target distribution and a second category that may indicate that the input random variable may not belong to the target distribution. The output of the generator model may be fed as the input of the discriminator model in the GAN model 108. To train the GAN model 108, a pre-trained discriminator model may be used, and the generator model may be progressively trained such that the generator model may be able to influence a discrimination-ability of the discriminator model. In other words, when trained, the generator model may be able to generate a random variable which may be so close to the target distribution that the discriminator model may not be able to accurately classify the generated random variable as a true target distribution value or a value from the generator model.

The AI model 110 may be a machine learning model, such as, a neural network model, that may be configured to make a decision that may be associated with a first request of the first user. The explainable AI model 112 may be an artificial intelligence model that may be configured to provide a set of reasons associated with an output of a target AI model (e.g., the AI model 110). In other words, the explainable AI model 112 may provide human interpretable reasons, explanations, or textual descriptions of the output of the target AI model (i.e., the AI model 110). In certain embodiments, the explainable AI model 112 may be a neural network model.

Each neural network model (such as, the generator model, the discriminator model, and the AI model 110, and the explainable AI model 112) may be a computational network or a system of artificial neurons, arranged in a plurality of layers, as nodes. The plurality of layers of each neural network model may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model. Outputs of each hidden layer may be coupled to inputs of at least one node in other layers of the neural network model. Node(s) in the final layer may receive inputs from at least one hidden layer to output a result. The number of layers and the number of nodes in each layer may be determined from hyper-parameters of the neural network model. Such hyper-parameters may be set before or while training the neural network model on a training dataset.

Each node of the neural network model may correspond to a mathematical function (e.g., a sigmoid function or a rectified linear unit) with a set of parameters, tunable during training of the neural network model. The set of parameters may include, for example, a weight parameter, a regularization parameter, and the like. Each node may use the mathematical function to compute an output based on one or more inputs from nodes in other layer(s) (e.g., previous layer(s)) of the neural network model. All or some of the nodes of the neural network model may correspond to same or a different mathematical function.

In training of the neural network model, one or more parameters of each node of the neural network model may be updated based on whether an output of the final layer for a given input from the training dataset matches a correct result based on a loss function for the neural network model. The above process may be repeated for same or a different input till a minima of loss function may be achieved, and a training error may be minimized. Several methods for training are known in art, for example, gradient descent, stochastic gradient descent, batch gradient descent, gradient boost, meta-heuristics, and the like.

Figure 2:
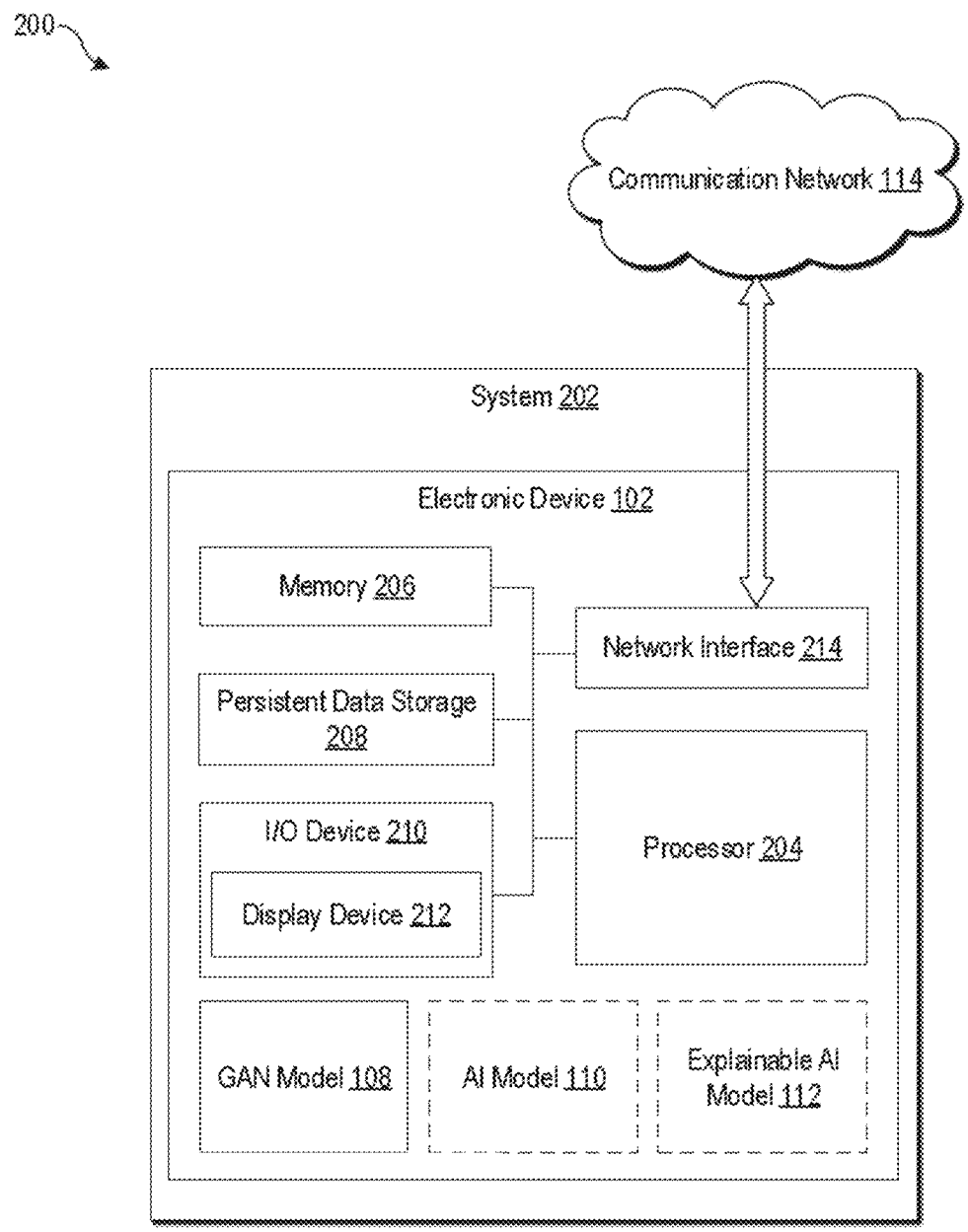
FIG. 2 is a block diagram that illustrates an exemplary electronic device for image generation based on ethical viewpoints.

Each neural network model may include electronic data, such as, for example, a software program, code of the software program, libraries, applications, scripts, or other logic or instructions for execution by a processing device (such as a processor 204 of the electronic device 102 of FIG. 2). Each neural network model may include code and routines configured to enable a computing device including the processor to perform one or more tasks such as, emulation of a target distribution (in case of the generator model), classification of input data (in case of the discriminator model), determination of an AI decision associated with the first request of the first user (in case of the AI model 110), or determination of a textual explanation of an output of the AI model 110 (in case of the explainable AI model 112). Additionally, or alternatively, the neural network model may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model may be implemented using a combination of hardware and software.

Examples of the neural network model (such as, the generator model, the discriminator model, the AI model 110, and the explainable AI model 112) may include, but are not limited to, a deep neural network (DNN), a convolutional neural network (CNN), an artificial neural network (ANN), a fully connected neural network, a deep Bayesian neural network, and/or a combination of such networks. In some embodiments, the neural network model may include numerical computation techniques using data flow graphs. In certain embodiments, the neural network model may be based on a hybrid architecture of multiple Deep Neural Networks (DNNs).

The communication network 114 may include a communication medium through which the electronic device 102 may communicate with the device that may store the database 104, and the user-end device 106. Examples of the communication network 114 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 114, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity(Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 104 and the user-end device 106. In addition, in some embodiments, the functionality of each of the database 104 and the user-end device 106 may be incorporated into the electronic device 102, without a deviation from the scope of the disclosure.

FIG. 2 is a block diagram that illustrates an exemplary electronic device for image generation based on ethical viewpoints, arranged in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, a persistent data storage 208, an input/output (I/O) device 210, a display device 212, a network interface 214, the GAN model 108, the AI model 110, and the explainable AI model 112.

The processor 204 may include suitable logic, circuitry, and/or interfaces that may be configured to execute program instructions associated with different operations to be executed by the electronic device 102. For example, some of the operations may include receiving the first textual description, determining the first set of vector embeddings, receiving the first set of ethical texts 116, determining the second set of vector embeddings, determining the first set of antonym words and the second set of synonym words, determining the set of sentences, selecting the first sentence, generating the first image, and rendering the generated first image. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a Graphics Processing Unit (GPU), a Central Processing Unit (CPU), a Reduced Instruction Set Computer (RISC) processor, an ASIC processor, a Complex Instruction Set Computer (CISC) processor, a co-processor, and/or a combination thereof.

The memory 206 may include suitable logic, circuitry, interfaces, and/or code that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices (e.g., flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may include suitable logic, circuitry, interfaces, and/or code that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or a special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer.

Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or a combination thereof may store the received first textual description, the received first set of ethical texts 116, the determined first set of antonym words and the second set of synonym words, the determined set of sentences, the selected first sentence, and the generated first image. Either of the memory 206, the persistent data storage 208, or a combination thereof may further store the GAN model 108, the AI model 110, and the explainable AI model 112.

The I/O device 210 may include suitable logic, circuitry, interfaces, and/or code that may be configured to receive a user input. For example, the I/O device 210 may receive a user input indicative of a query to generate the first image. In another example, the I/O device 210 may receive a user input indicative of the first textual description and/or the first set of ethical texts 116. The I/O device 210 may further receive a user input that may indicate a selection of the first sentence from the determined set of sentences. The I/O device 210 may be further configured to provide an output, in response to the user input. For example, the I/O device 210 may render the first image (that may be generated by the electronic device 102) on the display device 212. The I/O device 210 may include various input and output devices, which may be configured to communicate with the processor 204 and other components, such as the network interface 214. Examples of the input devices may include, but are not limited to, a touch screen, a keyboard, a mouse, a joystick, and/or a microphone. Examples of the output devices may include, but are not limited to, a display (e.g., the display screen 212) and a speaker.

The display device 212 may comprise suitable logic, circuitry, interfaces, and/or code that may be configured to display the generated first image. The display device 212 may be configured to receive the user input from the user 118. In such cases the display device 212 may be a touch screen to receive the user input. The display device 212 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 214 may comprise suitable logic, circuitry, interfaces, and/or code that may be configured to establish a communication between the electronic device 102, the database 104, and the user-end device 106, via the communication network 114. The network interface 214 may be implemented by use of various known technologies to support wired or wireless communication of the electronic device 102, via the communication network 114. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
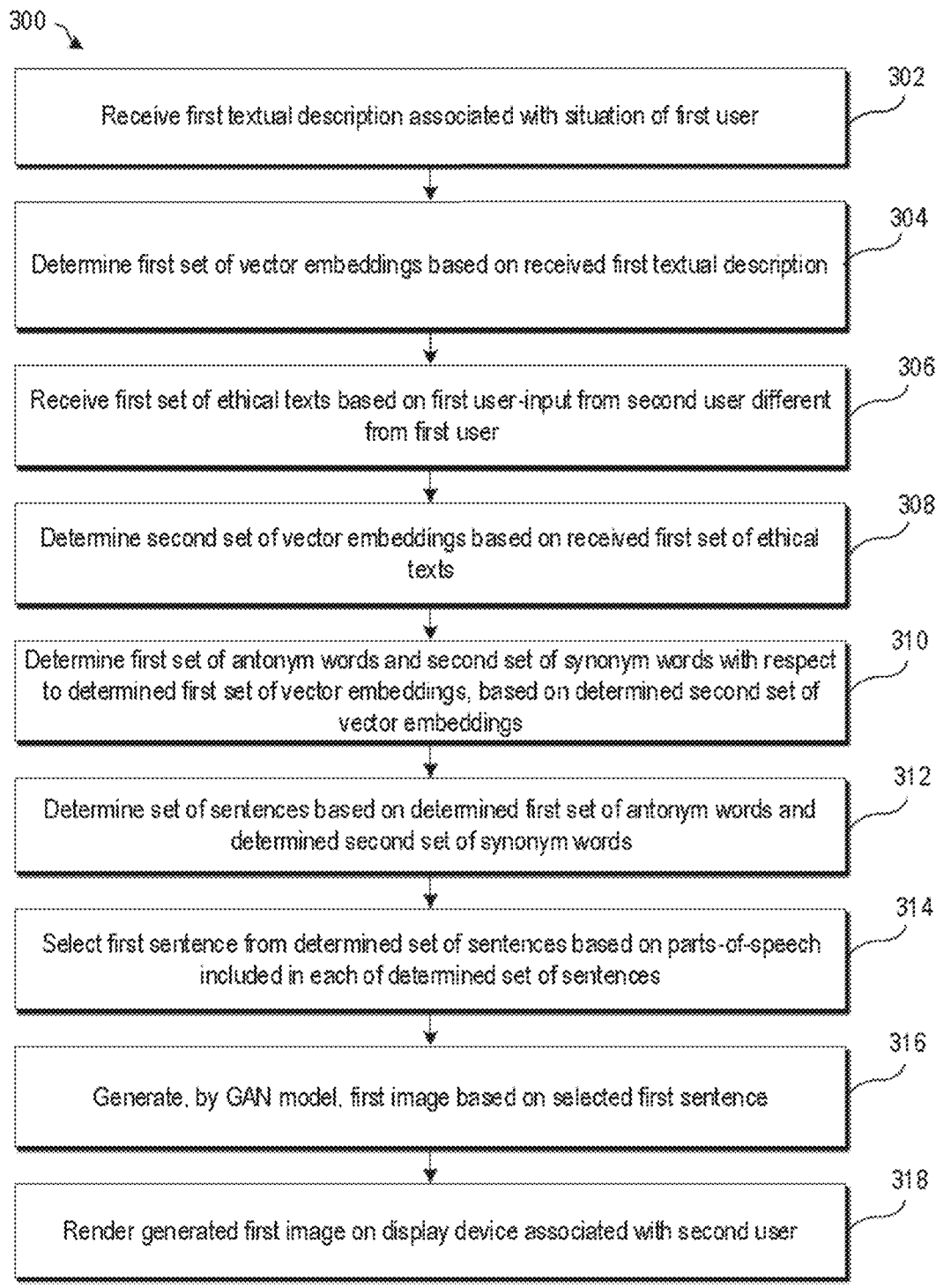
FIG. 3 is a diagram that illustrates a flowchart of an example method for image generation based on ethical viewpoints.

FIG. 3 is a diagram that illustrates a flowchart of an example method for image generation based on ethical viewpoints, in accordance with an embodiment of the disclosure. FIG. 3 is described in conjunction with elements from FIG. 1, and FIG. 2. With reference to FIG. 3, there is shown a flowchart 300. The method illustrated in the flowchart 300 may start at 302 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 300 may be divided into additional blocks, combined into fewer blocks, or eliminated, depending on the particular implementation.

At block 302, the first textual description associated with the situation of the first user may be received. In an embodiment, the processor 204 may be configured to receive the first textual description associated with the situation of the first user. The situation of the first user may correspond to a set of circumstances, which may be associated with the first user and may be prevalent when the first request may be made by the first user. For example, the first user may belong to a poor economic background and may face a finance crisis, when the first user may request for an education loan from a banking institution. In such case, the poor economic background and the financial crisis may correspond to the situation of the first user. In an embodiment, the received first textual description may include, but is not limited to, information about a first decision made by the AI model 110, information about a first reason associated with the first decision, and information about a first set of ethical conditions on which the AI model 110 may be trained to make the first decision. Herein, the first decision (e.g., an acceptance or a rejection) made by the AI model 110 may be associated with the first request (e.g., a loan application) of the first user. The information about the first reason associated with the first decision may be received from the explainable AI model 112. The explainable AI model 112 may analyze an output of the AI model 110 and provide the information about the first reason associated with the first decision of the AI model 110, based on the analysis. For example, in case the first request of the first user is a loan application request and the first decision of the AI model 110 is a decision to reject the loan application request, the explainable AI model 112 may determine the first reason associated with the first decision as a poor credit score of the first user. Also, herein, the first set of ethical conditions may be based on a user input from a designer or programmer of the AI model 110, or a stakeholder who may be involved in a decision-making process associated with the first request of the first user. For example, the first set of ethical conditions may include one or more ethical conditions associated with deontological ethics, such as, a set of condition-based on rules and regulations associated with an evaluation of the first request by the AI model 110 for decision-making. Such first set of ethical conditions may be used to train the AI model 110 to make an AI decision to reject or accept a request (e.g., the first request) of a user (e.g., the first user). The reception of the first textual description is described further, for example, in FIG. 4.

At block 304, the first set of vector embeddings may be determined based on the received first textual description. In an embodiment, the processor 204 may be configured to determine the first set of vector embeddings based on the received first textual description. As discussed, the received first textual description may include, but is not limited to, information about the first decision, information about the first reason, and information about the first set of ethical conditions. In an embodiment, to determine the first set of vector embeddings, the processor 204 may map the first decision to a first vector embedding, the first reason to a second vector embedding, and the first set of conditions to a third vector embedding. Herein, the first set of vector embeddings may include a combination of the first vector embedding, the second vector embedding, and the third vector embedding. The mapping of a text or phrase (e.g., the first decision, the first reason, and the first set of conditions) to a respective vector embedding may be based on a word-embedding technique by use of which words with a same meaning may be represented with a common vector representation. Herein, each individual word of the text or phrase may be represented as a real-valued vector in a predetermined vector space of multiple dimensions based on a vocabulary of words from a text corpus. In an embodiment, the first set of vector embeddings may be determined by use of a one-hot vector-embedding technique. Examples of other word-embedding techniques that may be used may include, but are not limited to, a word2vec technique (using for example, a Continuous Bag-of-Words (CBOW) model, or a Continuous Skip-Gram model) or a Global Vectors for Word Representation (GloVe) technique.

For example, the first decision of the AI model 110 may be to deny a loan application request (i.e., the first request) of the first user. The first vector embedding determined for the first decision may be represented by a first vector, such as, "[0]" (for the phrase "deny"). Further, the first reason associated with the first decision may be a poor credit score of the first user. The second vector embedding determined for the first reason may be represented by a second vector, such as "[0.4, 0.5, . . . 0.9]" (for the phrase "poor credit score"). Also, the first set of ethical conditions on which the AI model 110 may be trained may be based on deontological ethics. In an example, the first set of conditions may include rules and regulations associated with the evaluation of the first request by the AI model 110 for decision-making. Exemplary rules and regulation may include a credit score of the first user being above a certain threshold value (e.g., "credit score>=750") and/or a net worth of the first user being above a certain threshold value (e.g., "net worth>=USD 250,000"). The third vector embedding determined for the first set of conditions may be represented by a third vector, such as, "[0, 0, 1, 0, . . . ]" (for the phrases "credit score>=750" and/or "net worth>=USD 250,000").

At block 306, the first set of ethical texts 116 may be received based on the first user-input from the second user different from the first user. In an embodiment, the processor 204 may be configured to receive the first set of ethical texts 116 from the database 104 based on the first user-input from the second user different from the first user. In an example, the second user may be the user 118 associated with the user-end device 106. Based on a user-input (e.g., the first user-input) from the second user, the processor 204 may be configured to extract the first set of ethical texts 116 from the database 104 and store the extracted first set of ethical texts 116 in the memory 206 and/or the persistent data storage 208. Examples of the first set of ethical texts 116 may include, but are not limited to, research papers, books, peer reviewed articles, moral texts, philosophical texts, literary works, legal documents, or documents on natural law, associated with ethical theories.

At block 308, the second set of vector embeddings may be determined based on the received first set of ethical texts 116. In an embodiment, the processor 204 may be configured to determine the second set of vector embeddings based on the received first set of ethical texts 116. As an example, but not limitation, the second set of vector embeddings may be determined based on a context-based skip gram model technique. The determination of the second set of vector embeddings is described further, for example, in FIG. 5.

At block 310, the first set of antonym words and the second set of synonym words with respect to the determined first set of vector embeddings may be determined, based on the determined second set of vector embeddings. In an embodiment, the processor 204 may be configured to determine the first set of antonym words and the second set of synonym words with respect to the determined first set of vector embeddings, based on the determined second set of vector embeddings. For example, each of the first set of vector embeddings and the second set of vector embeddings may include word embeddings corresponding to words related to a certain context. The processor 204 may determine a similarity score between each vector embedding from the first set of vector embeddings with respect to each vector embedding from the second set of vector embeddings. An example of the similarity score may be a cosine similarity score, which may be determined as $\cos \theta = (\overline{A} \cdot \overline{B})/(|\overline{A}||\overline{B}|)$, where A and B may represent two vectors, "." may represent a dot product operator, and "| |" may represent modulus of a vector. A pair of vector embeddings whose similarity score is determined as "−1" may correspond to a pair of words with opposite meanings in the same context. The processor 204 may determine the first set of antonym words based on such pairs of words with the opposite meanings in the same context. Also, a pair of vector embeddings whose similarity score is determined as "1" may correspond to a pair of words with same or similar meaning related to the same context. The processor 204 may determine the second set of synonym words based on such pairs of words with the same or similar meaning related to the same context.

For example, the first set of vector embeddings may include a set of word embeddings for the phrase "poor credit score" corresponding to the first reason associated with the first decision of the AI model 110. Based on determination of the first set of antonym words and the second set of synonym words, phrases such as, "low income", "lack of education", and "poor economic background" may be determined. As the second set of vector embeddings may be determined based on the received first set of ethical texts 116, the second set of vector embeddings may correspond to ethical embeddings related to certain ethical viewpoints. Thus, nearest opposite words (i.e., the first set of antonym words) and nearest related words (i.e., the second set of synonym words) may be determined from the word embeddings (i.e., the first set of vector embeddings) of the first textual description, based on the ethical embeddings (i.e., the second set of vector embeddings) of the first set of ethical texts 116.

It should be noted that the determination of the first set of antonym words and the second set of synonym words based on the similarity score should not be construed to limit the scope of the disclosure. Various techniques may be used to determine the first set of antonym words and the second set of synonym words, without departure from the scope of the disclosure.

At block 312, the set of sentences may be determined based on the determined first set of antonym words and the determined second set of synonym words. In an embodiment, the processor 204 may be configured to determine the set of sentences based on the determined first set of antonym words and the determined second set of synonym words. In an example, the processor 204 may apply a natural language processing technique and/or a neural network model on the determined first set of antonym words and the determined second set of synonym words to determine the set of sentences with correct grammar. As an example, the processor 204 may use a "CoreNLP" package to determine the set of sentences, each of which may have a correct grammar. In an embodiment, the processor 204 may render the determined set of sentences on a display device (for example, a display device of the user-end device 106 or the display screen 212 of the electronic device 102) associated with the second user. Based on the rendered set of sentences, the processor 204 may receive a user input indicative of a validation of a grammatical correctness of each of the determined set of sentences.

At block 314, the first sentence may be selected from the determined set of sentences based on parts-of-speech included in each of the determined set of sentences. In an embodiment, the processor 204 may be configured to select the first sentence from the determined set of sentences based on the parts-of-speech included in each of the determined set of sentences. In another embodiment, the selection of the first sentence from the determined set of sentences may be further based on a third user-input from the second user (e.g., the user 118). The selection of the first sentence is described further, for example, in FIG. 6.

In an embodiment, the selected first sentence may correspond to a first ethical condition, which may be different from a second ethical condition corresponding to the received first textual description. As discussed, the received first textual description may include the information associated with the first decision, the information associated with the first reason, and the information associated with the first set of ethical conditions on which the AI model 110 may be trained to make a decision. The second ethical condition corresponding to the received first textual description may be predetermined. For example, the second ethical condition may correspond to deontological ethics. On the other hand, the first set of ethical texts 116 may be selected based on a user input from the second user, such as, a developer, programmer, or designer of the AI model 110, or an end-user who may use the AI model 110 for decision-making. Thus, the selected first set of ethical texts 116 may correspond to a different ethical condition than the second ethical condition of the received first ethical condition. Also, the set of sentences including the first sentence may be determined from the first set of antonym words and the second set of synonym words. Herein, the first set of antonym words and the second set of synonym words may include nearest opposite words and nearest related words corresponding to the ethical conditions associated with the received first textual description and the selected first set of ethical texts 116. Thus, in certain cases, the selected first sentence may correspond to a first ethical condition different from the second ethical condition corresponding to the received first textual description. Hence, the first sentence may be a rephrased sentence as compared to the first textual description and the first sentence may encompass a broader context than the context of the first textual description.

At block 316, the first image may be generated, by use of the GAN model 108, based on the selected first sentence. In an embodiment, the processor 204 may be configured to generate, by use of the GAN model 108, the first image based on the selected first sentence. The generated first image may be representative of one or more of, but not limited to, the situation of the first user, a consequence of a decision corresponding to a request of the first user, or a desirable ethical value corresponding to the situation of the first user. The training of the GAN model 108 is described next.

In an embodiment, the GAN model 108 may be trained based on an image dataset. In an example, the image dataset may be stored in the database 104 and retrieved by the processor 204 to train the GAN model 108. In an embodiment, the processor 204 may be configured to train the GAN model 108 based on the retrieved image dataset. The GAN model 108 may include the generator model (i.e., the first neural network model) and the discriminator model (i.e., the second neural network model). The discriminator model may be a pre-trained neural network model that may be configured to classify an input image generated by the generator model. The input image may be categorized in either a first category or a second category. The first category may indicate that the input image may be a generated image that may not belong to a target distribution of the generator model. The second category may indicate that the input image may belong to the target distribution of the generator model. The generator model may be trained based on the received image dataset such that the generator model may generate images that may be like images belonging to the target distribution of images for the generator model. The training of the generator model (and hence the GAN model 108) may continue till the generator model may be able to generate images that may be categorized by the discriminator model in one of the first category or the second category with a 50% probability (or a 50±a % probability, where "a" may be a small-valued threshold).

In an example, the trained GAN model 108 may correspond to a text-to-image converter, such as, a zero-shot text-to-image converter model. The zero-shot text-to-image converter model may be a transformer neural network model that may auto-regressively model text and image tokens as a single data stream. For example, to train the zero-shot text-to-image converter model, a discrete variational auto-encoder (dVAE) may be trained to compress each image (e.g., 256×256 RGB images) in the image dataset into sub-image grids (e.g., 32×32 grids) of image tokens. Herein, 8192 possible values may be attained by each element. Thus, the context size of the transformer may be reduced 192 times without significant degradation of perceived visual quality. Further, up to 256 Byte-Pair Encoding (BPE)-encoded text tokens may be concatenated with the 32×32 (i.e., 1024) image tokens. Thereafter, an autoregressive transformer may be trained to model a joint distribution over the text and image tokens. In the training phase, evidence lower bound (ELB) on the joint likelihood of the model distribution over the images, captions, and tokens may be maximized for the encoded RGB image.

Once the GAN model 108 may be trained, the processor 204 may feed the selected first sentence to the trained GAN model 108 as an input. The trained GAN model 108 may be used to generate the first image based on the selected first sentence that may be input to the trained GAN model 108. Examples of the generated first image are provided, for example, in FIGS. 7A, 7B, and 7C.

At block 318, the generated first image may be rendered on a display device associated with the second user. In an embodiment, the processor 204 may be configured to render the generated first image on a display device associated with the second user. For example, the processor 204 may display the generated first image on the display screen 212 of the electronic device 102. Alternatively, the processor 204 may transmit the generated first image to the user-end device 106 and may control the user-end device 106 to render the transmitted first image on a display device of the user-end device 106. Control may pass to end.

Although the flowchart 300 is illustrated as discrete operations, such as 302, 304, 306, 308, 310, 312, 314, 316, and 318. However, in certain embodiments, such discrete operations may be further divided into additional operations, combined into fewer operations, or eliminated, depending on the particular implementation without detracting from the essence of the disclosed embodiments.

Figure 4:
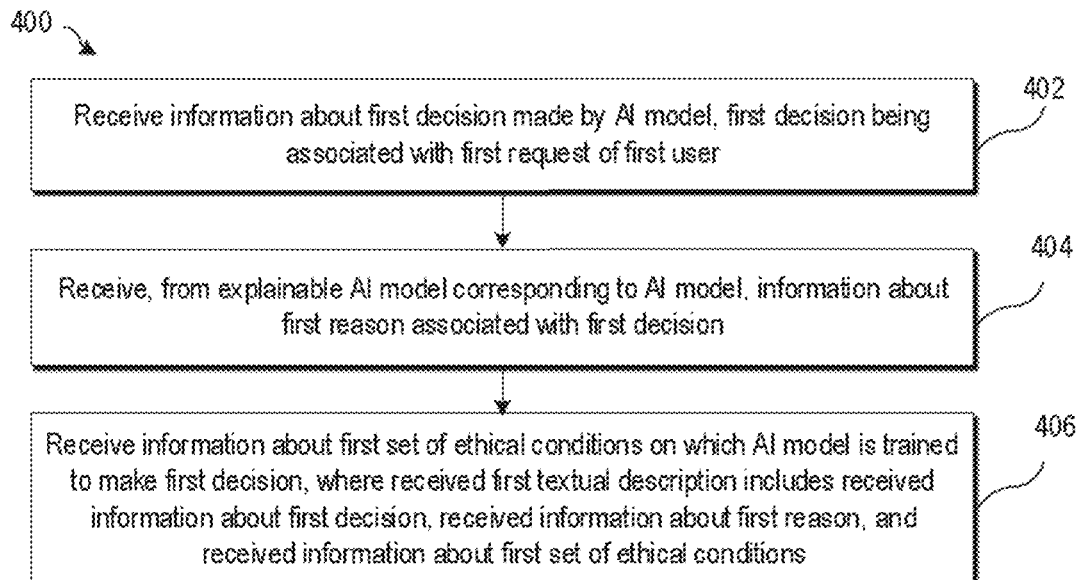
FIG. 4 is a diagram that illustrates a flowchart of an example method for reception of a first description of a situation of a first user.

FIG. 4 is a diagram that illustrates a flowchart of an example method for reception of a first description of a situation of a first user, in accordance with an embodiment of the disclosure. FIG. 4 is described in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, the information about the first decision made by the AI model 110 may be received. The first decision may be associated with the first request of the first user. In an embodiment, the processor 204 may receive the information about the first decision made by the AI model 110. The AI model 110 may be trained to make a decision associated with a request of a user based on certain predefined conditions (e.g., the first set of ethical conditions). The predefined conditions may be provided by one or more stakeholders who may develop or use the AI model 110 for decision-making. Examples of such stakeholders may include, but are not limited to, designers, developers, programmers, and end-users (such as, officials of a financial institution) associated with the AI model 110. For example, the AI model 110 may make a "reject decision" (i.e., the AI decision) associated with a loan application request (i.e., the first request) of a user (i.e., the first user), based on a credit score of the user being below a certain threshold value (i.e., the predefined condition). The processor 204 may receive the output corresponding to the AI decision from the AI model 110 based on an application of the AI model 110 on the first request of the first user. As an example, in case the AI decision is a "reject decision", the processor 204 may receive an output phrase, such as, "Deny" or an output binary value "0" from the AI model 110. Alternatively, in case the AI decision is an "accept decision", the processor 204 may receive an output phrase, such as, "Accept" or an output binary value "1" from the AI model 110.

At block 404, the information about the first reason associated with the first decision may be received from the explainable AI model 112 corresponding to the AI model 110. In an embodiment, the processor 204 may be configured to receive the information about the first reason associated with the first decision from the explainable AI model 112 corresponding to the AI model 110. The explainable AI model 112 may be a neural network model that may be trained on a task to determine a reason associated with decisions of an AI model (such as, the AI model 110). For example, the AI model 110 may convert the first request into a set of features and analyze the set of features to determine the first decision. The explainable AI model 112 may determine a score associated with each of the set of features. The score associated with a certain feature from the set of features may indicate a contribution or weight of the feature for the computation of the first decision. As an example, the score associated with each feature may be a real number in the range of 0 to 1. The explainable AI model 112 may identify features with the highest scores (e.g., top 5 features by scores) and/or features whose scores exceed a certain threshold value (e.g., 0.15). Based on the identified features, the explainable AI model 112 may determine the first reason associated with the first decision. For example, the explainable AI model 112 may determine "poor credit score" as the first reason associated with the first decision to "deny" the loan application request (i.e., the first request) of the first user. For an example, in such case, the first user may be from a poor economic background and may have defaulted timely payments to prior debts.

At block 406, the information about the first set of ethical conditions on which the AI model 110 may be trained to make the first decision may be received. The received first textual description may include the received information about the first decision, the received information about the first reason, and the received information about the first set of ethical conditions. In an embodiment, the processor 204 may be configured to receive the information about the first set of ethical conditions on which the AI model 110 may be trained to make the first decision. For example, the first set of ethical conditions may be based on a user input from a designer, a programmer, or a developer of the AI model 110, or any stakeholder who may be involved in decision-making associated with the first request of the first user. For example, the first set of ethical conditions may include one or more ethical conditions associated with deontological ethics, such as, a set of conditions based on rules and regulations associated with the evaluation of the first request by the AI model 110 for decision-making. By way of example, and not limitation, the rules and regulations may include a net worth of the first user being above a certain first threshold, a credit score of the first user being above a certain second threshold, a value of a collateral pledged by the first user being above a certain third threshold, an average income of the first user being above a certain fourth threshold, and the like. Control may pass to end.

Although the flowchart 400 is illustrated as discrete operations, such as 402, 404, and 406. However, in certain embodiments, such discrete operations may be further divided into additional operations, combined into fewer operations, or eliminated, depending on the particular implementation without detracting from the essence of the disclosed embodiments.

Figure 5:
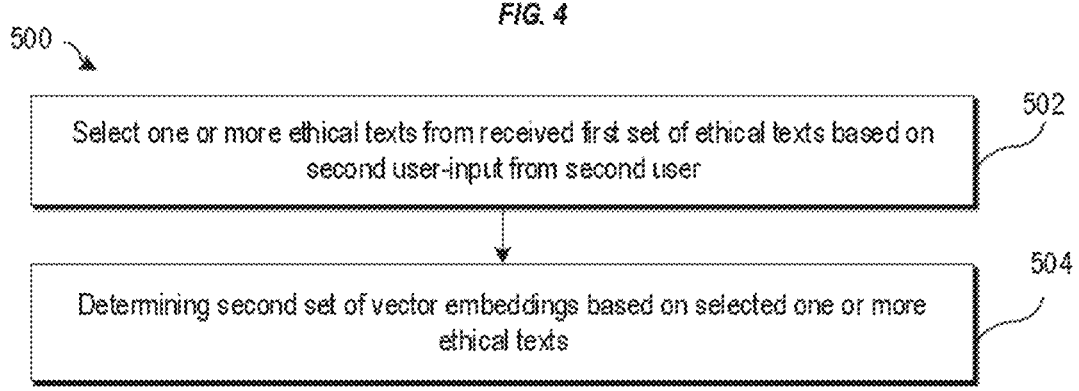
FIG. 5 is a diagram that illustrates a flowchart of an example method for determination of a second set of vector embeddings.

FIG. 5 is a diagram that illustrates a flowchart of an example method for determination of a second set of vector embeddings, in accordance with an embodiment of the disclosure. FIG. 5 is described in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, the one or more ethical texts may be selected from the received first set of ethical texts 116 based on the second user-input from the second user. In an embodiment, the processor 204 may be configured to select the one or more ethical texts from the received first set of ethical texts 116 based on the second user-input from the second user. The received first set of ethical texts 116 may correspond to one or more of, but not limited to, a set of consequentialism-based ethical texts, a set of deontological-based ethical texts, a set of situational-based ethical texts, a set of subjectivism-based ethical texts, a set of virtue-based ethical texts, a set of intuitionism-based ethical texts, or a set of utilitarian-based ethical texts. By way of example, and not limitation, the set of consequentialism-based ethical texts may include texts associated with ethics related to "an outcome of a decision". Further, the set of deontological-based ethical texts may include texts associated with ethics related to "rules and regulation that may govern decision-making". The set of situational-based ethical texts may include texts associated with ethics related to "a context that may be relevant to decision-making". Also, the set of subjectivism-based ethical texts may include texts associated with ethics related to "individual viewpoints of people". The set of virtue-based ethical texts may include texts associated with ethics related to "an emphasis on morality in decision-making". Further, the set of intuitionism-based ethical texts may include texts associated with ethics related to "a non-inferential moral knowledge or a self-evident knowledge". The set of utilitarian-based ethical texts may include texts associated with ethics related to "a maximization of a utility or well-being of all affected individuals or parties".

For example, the processor 204 may receive a user-input (i.e., the second user-input) indicative of a selection of the first ethical text 116A and the second ethical text 116B from the received first set of ethical texts 116. In such case, the first ethical text 116A and the second ethical text 116B may be selected from the received first set of ethical texts 116 as the one or more ethical texts. In an example, the selected first ethical text 116A and the selected second ethical text 116B may correspond to different ethical conditions. For instance, the first ethical text 116A may correspond to the set of consequentialism-based ethical texts. On the other hand, the second ethical text 116B may correspond to the set of deontological-based ethical texts. Alternatively, both the selected first ethical text 116A and the selected second ethical text 116B may correspond to the same ethical conditions. For instance, both the selected first ethical text 116A and the selected second ethical text 116B may correspond to the set of subjectivism-based ethical texts. Thus, based on the second user-input, ethical conditions, or ethical viewpoints to be used for the generation of the first image may be selected.

At block 504, the second set of vector embeddings may be determined based on the selected one or more ethical texts. In an embodiment, the processor 204 may be configured to determine the second set of vector embeddings based on the selected one or more ethical texts. As an example, and not limitation, the second set of vector embeddings may be determined based on a context-based skip gram model technique. For example, the processor 204 may determine a word embedding (of the second set of vector embeddings) of a certain word (from the selected one or more ethical texts) based on a maximization of classification of the word with respect to other words in the same sentence. Each word may be fed to a log-linear classifier as an input. The log-linear classifier may have a projection layer that may be configured to determine similar words within a particular range (e.g., 3 words) before and after the input word. Distant words may be lesser relevant to a certain word as compared to closer words. Hence, in the training phase, a lesser weight may be assigned to the distant words as compared to the closer words, based on a lower sampling of the distant words. Control may pass to end.

Although the flowchart 500 is illustrated as discrete operations, such as 502 and 504. However, in certain embodiments, such discrete operations may be further divided into additional operations, combined into fewer operations, or eliminated, depending on the particular implementation without detracting from the essence of the disclosed embodiments.

Figure 6:
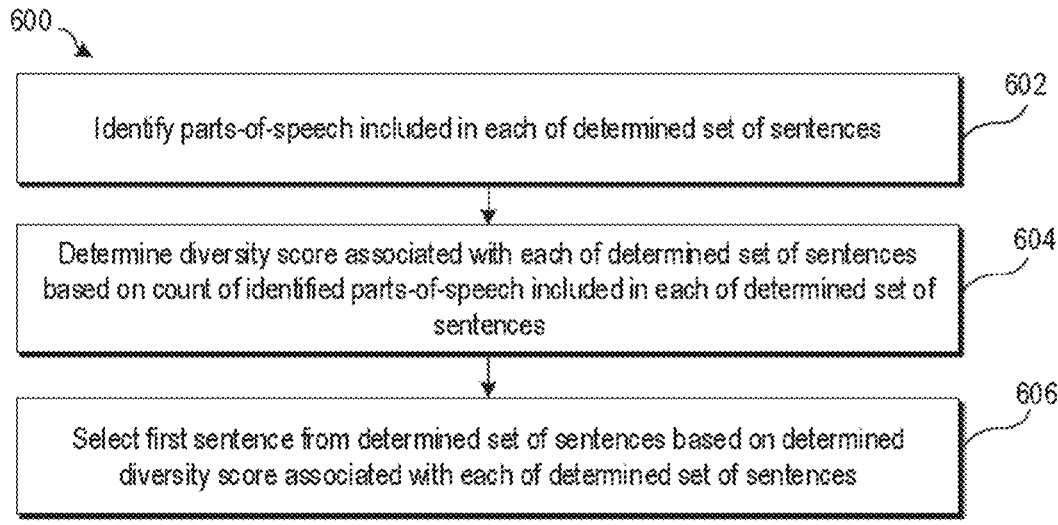
FIG. 6 is a diagram that illustrates a flowchart of an example method for selection of a first sentence from a set of sentences determined based on a first textual description and a first set of ethical texts.

FIG. 6 is a diagram that illustrates a flowchart of an example method for selection of a first sentence from a set of sentences determined based on a first textual description and a first set of ethical texts, in accordance with an embodiment of the disclosure. FIG. 6 is described in conjunction with elements from FIG. 1, FIG. 2, FIG. 3, FIG. 4, and FIG. 5. With reference to FIG. 6, there is shown a flowchart 600. The method illustrated in the flowchart 600 may start at 602 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, the parts-of-speech included in each of the determined set of sentences may be identified. In an embodiment, the processor 204 may be configured to identify the parts-of-speech included in each of the determined set of sentences. Examples of the parts-of-speech may include, but are not limited to, a verb, a noun, an adjective, a determinant, an adverb, a pronoun, a preposition, a conjunction, and an interjection. In an example, the processor 204 may use a log-linear parts-of-speech tagger to identify the parts-of-speech included in each of the determined set of sentences.

At block 604, the diversity score associated with each of the determined set of sentences may be determined based on a count of the identified parts-of-speech included in each of the determined set of sentences. In an embodiment, the processor 204 may be configured to determine the diversity score associated with each of the determined set of sentences based on the count of the identified parts-of-speech included in each of the determined set of sentences. For example, the processor 204 may determine the count of occurrences of each parts-of-speech type (e.g., pronouns, verbs, adjectives, adverbs, etc.) in each sentence of the determined set of sentences based on the identification of the parts-of-speech included in each sentence of the set of sentences. In an embodiment, the processor 204 may determine the diversity score associated with a sentence based on a sum of the count of each parts-of-speech identified in the sentence. For example, the diversity score of a sentence $S_1$, such as, "Person X does not have a stable income" may be determined as 5 (i.e., 1 adjective+2 nouns+2 verbs=1+2+2=5). In an embodiment, the processor 204 may assign a weight to each type of parts-of-speech identified in a sentence for the determination of the diversity score. In such case, the diversity score may be determined as a weighted sum of the counts of each type of parts-of-speech identified in the sentence. For example, adjectives may be assigned a weight of "2" and each of the remaining parts-of-speech may be assigned a weight of "1" for the determination of the diversity score for the sentence $S_1$. In such case, the diversity score for the sentence $S_1$ may be determined as 6 (i.e., (1 adjective)*2+(2 nouns)*1+(2 verbs)*1=1*2+2+2=6).

At block 606, the first sentence may be selected from the determined set of sentences, based on the diversity score associated with each of the determined set of sentences. In an embodiment, the processor 204 may be configured to select the first sentence from the determined set of sentences, based on the diversity score associated with each of the determined set of sentences. For example, a sentence with the highest diversity score may be selected from the determined set of sentences as the first sentence. In an embodiment, in case the diversity score of two sentences is the same, the processor 204 may consider the sentence that has a greater number of adjectives or adverbs as a sentence with a higher priority among the two sentences for selection of the first sentence. Such prioritization of sentences may be efficient as adjectives or adverbs in a sentence may be more likely to act as descriptive words in the sentence, as compared to other words of the sentence. As the first sentence selected from the set of sentences may have the highest diversity score from amongst the set of sentences, the first sentence may capture the broadest context amongst each of the set of sentences.

An exemplary sentence Sz may be "Person X comes from a poor economic background, due to which the individual could not secure a good education to land in a well-paying job". The sentence Sz may include 4 adjectives, 3 nouns, and 4 verbs. Thus, the diversity score of the sentence Sz may be determined as 11 (i.e., 4+3+4). On the other hand, the sentence $S_1$ (i.e., "Person X does not have a stable income") may include 1 adjective, 2 nouns, and 2 verbs. Hence, the diversity score of the sentence S1 may be 5 (i.e., 1+2+2). From amongst the two sentences $S_1$ and $S_2$, the sentence Sz may be selected as the first sentence as the diversity score (i.e., 11) of the sentence $S_1$ may be greater than the diversity score (i.e., 5) of the sentence $S_2$.

In an embodiment, the selection of the first sentence from the determined set of sentences may be further based on a third user-input from the second user (e.g., the user 118). For example, the processor 204 may render the determined set of sentences on a display device (e.g., a display device of the user-end device 106 or the display device 212 of the electronic device 102) associated with the second user (e.g., the user 118). Based on the rendered set of sentences, the processor 204 may receive a selection of the first sentence from the set of sentences as the third user-input. In another embodiment, the processor 204 may render the selected first sentence along with the determined set of sentences on the display device associated with the second user. Based on the rendered first sentence, the processor 204 may receive a user input indicative of a confirmation of the selection of the first sentence from the set of sentences. Alternatively, the processor 204 may receive a user input indicative of a selection of second sentence from the set of sentences, instead of the first sentence. Based on the reception of such user input, the processor 204 may select the second sentence (instead of the first sentence) from the set of sentences for the generation of the first image. Control may pass to end.

Although the flowchart 600 is illustrated as discrete operations, such as 602, 604, and 606. However, in certain embodiments, such discrete operations may be further divided into additional operations, combined into fewer operations, or eliminated, depending on the particular implementation without detracting from the essence of the disclosed embodiments.

Figure 7A:
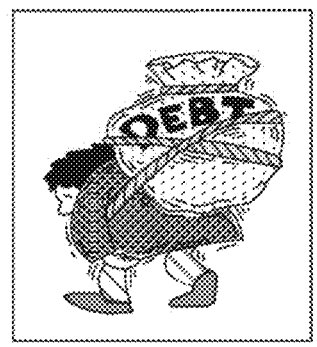
FIGS. 7A, 7B, and 7C are diagrams that illustrate exemplary first images generated for exemplary situations of a user based on ethical texts, all according to at least one embodiment described in the present disclosure.
Figure 7B:
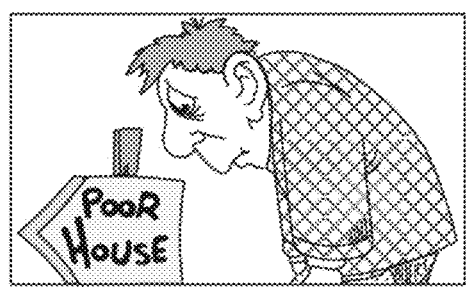
Figure 7C:
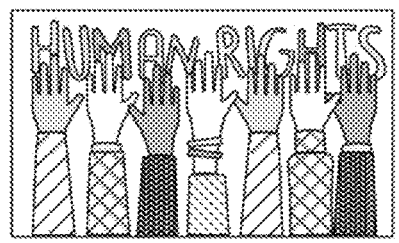

FIGS. 7A, 7B, and 7C are diagrams that illustrate exemplary first images generated for exemplary situations of a user based on ethical texts, in accordance with an embodiment of the disclosure. FIGS. 7A, 7B, and 7C are described in conjunction with elements from FIG. 1, FIG. 2, FIG. 3, FIG. 4, FIG. 5, and FIG. 6. With reference to FIGS. 7A, 7B, and 7C, there is shown example first images 700A, 700B, and 700C, respectively. Each of the first images 700A, 700B, and 700C may be associated with a situation of the first user. As an example, the situation may correspond to a circumstance in which the first user may belong to a poor economic background. Further, the situation may correspond to a scenario in which the first user may request for an education loan from a financial institution and the financial institution may use the AI model 110 to evaluate the education loan request of the first user.

With reference to FIG. 7A, the first image 700A may represent a situational ethics perspective associated with the situation of the first user. Herein, the set of situational-based ethical texts may be selected from the first set of ethical texts 116 for the generation of the first image 700A. For example, according to the situational ethics perspective, the first user's economic background may affect the first user's chances to get a good education and thereby get into a good job. As shown in FIG. 7A, the first user is shown as an overburdened person with loads of debt, which may make the life of the first user struggleful.

With reference to FIG. 7B, the first image 700B may represent a consequentialism ethics perspective associated with the situation of the first user. Herein, the set of consequentialism-based ethical texts may be selected from the first set of ethical texts 116 for the generation of the first image 700B. For example, according to the consequentialism ethics perspective, there may be adverse consequences in case the first user's education loan request is denied. As shown in FIG. 7B, the first user is shown to remain in a poor house, in case the first user is denied the education loan.

With reference to FIG. 7C, the first image 700C may represent moral values-based ethics perspective associated with the situation of the first user. Herein, the set of virtue-based ethical texts may be selected from the first set of ethical texts 116 for the generation of the first image 700C. For example, according to the moral values-based ethics perspective, all individuals should be treated equally as equality is a fundamental human right, as shown in FIG. 7C. Since education is a human right, therefore the loan request of the first user should be approved.

In an example, the first image may be useful to visualize one or more of a situation (for example, in case of the first image 700A) of the first user, explanations (for example, a poor credit score) of the first decision, a consequence (for example, in case of the first image 700B) of the AI decision, or a desirable ethical value (for example, in case of the first image 700C) corresponding to the situation of the first user. The illustrations of the first images 700A, 700B, and 700C may elucidate different constraints associated with the AI model 110 and help in enhancement of inclusivity of poor people to get education loans. Based on such illustrations, different stakeholders (e.g., developers, designers, and users) of the AI model 110 may realize an impact of various factors on the AI decision and the effect of the AI decision on the life of the first user. The illustrations, such as, the first images 700A, 700B, 700C, may trigger empathy among the stakeholders towards the first user. Accordingly, the stakeholders may update relevant constraints and/or the first set of ethical conditions associated with the AI model 110. Based on the updates, a decision of the AI model 110 may now be favorable even for poor people like the first user, and the poor people may also be granted education loans. Hence, based on grant of the education loans, the poor people may attain better education, get good jobs, and their living standards may be elevated, which may thereby promote inclusivity.

It may be noted that the first images 700A, 700B, and 700C shown in FIGS. 7A, 7B, and 7C, respectively, are presented merely as examples and should not be construed to limit the scope of the disclosure.

It should be noted that the scenario of AI model-based loan application evaluation (such as, for educational loans) is presented merely as an exemplary scenario of application of the disclosure and should not be construed to limit the scope of the disclosure. The disclosure may be applicable to various other scenarios, without departure from the scope of the disclosure. For example, the disclosure may be applicable to various other use cases, such as, a customer care use case and an advertisement/personalized recommendations use case. As an example, in the customer care use case, the disclosed electronic device 102 may be used to generate friendly avatar images to garner customer trust based on different ethical perspectives determined by use of a customer input. The avatar images may cater to ethical perspectives relevant for the customer. The avatar images may be used as customer care bots (such as AI agents) in various application areas including, but not limited to, banking, counseling, retail, and sales. In another example, in the advertisement/personalized recommendations use case, the disclosed electronic device 102 may be used to showcase different viewpoints that may appeal to different types of customers. For example, based on a customer's input, an ethical viewpoint of the customer may be determined. An image of a product may be showcased based on the ethical viewpoint of the customer to attract the customer and catch his/her attention.

The disclosed electronic device 102 may be configured to generate the first image for the situation of the first user based on ethical texts. Herein, the situation of the first user may be evaluated by the AI model 110 to provide the first decision associated with the first request of the first user. The electronic device 102 may receive the first textual description associated with the situation of the first user and determine the first set of vector embeddings based on the received first textual description. Based on a user input from a second user, the electronic device 102 may receive the first set of ethical texts 116 and determine the second set of vector embeddings based on the received first set of ethical texts 116. Herein, each ethical text may be associated with an ethical viewpoint. The electronic device 102 may determine the first set of antonym words and the second set of synonym words with respect to the determined first set of vector embeddings, based on the determined second set of vector embeddings. Herein, antonyms and synonyms between vector embeddings of the first textual description of the situation and the received first set of ethical texts 116 may include a set of relevant words that may capture a broad context with respect to the first textual description and the received first set of ethical texts 116. The electronic device 102 may determine the set of sentences based on the determined first set of antonym words and the determined second set of synonym words. From the determined set of sentences, the electronic device 102 may select the first sentence, based on the parts-of-speech included in each of the determined set of sentences. The first sentence, that may be selected based on the parts-of-speech, may be a sentence that may have a broadest context among the determined set of sentences. Based on the selected first sentence, the electronic device 102 may determine the first image by use of the GAN model 108. Thereafter, the electronic device 102 may render the generated first image on a display device associated with the second user. As the first image may be generated based on the selected first sentence, therefore, the generated first image may correspond to the broadest context associated with first textual description and the ethical viewpoint associated with the first set of ethical texts 116. Such first image may be useful to visualize one or more of the situation of the first user, explanations of the first decision, a consequence of the AI decision, or a desirable ethical value corresponding to the situation of the first user.

Typically, conventional systems may provide a textual explanation of an AI decision. An example of such textual explanation may be a text, such as, "100 more credit rating points are required to secure a loan". Such textual explanation may not be impactful and may not consider ethical viewpoints associated with the situation of the first user. Certain conventional systems may provide visualizations of an AI decision. However, such visualizations may not be intuitive and may not be understandable by non-technical users. Also, such visualizations may not help trigger empathy, which may be essential to understand a problem from the perspective of different stakeholders. The disclosed electronic device 102, on the other hand, may generate an image (such as, the first image) that may represent a broadest context associated with the situation of the first user, the explanation of the AI decision, the consequence of the AI decision, or the desirable ethical value corresponding to the situation of the first user. The presentation of such generated image to relevant stakeholders (such as, AI designers, programmers, and decision-makers in an organization) may trigger empathy towards the first user, elucidate different ethical viewpoints, and also enhance diversity and inclusivity in the AI-based decision-making process.

Various embodiments of the disclosure may provide one or more non-transitory computer-readable storage media configured to store instructions that, in response to being executed, cause a system (such as, the example electronic device 102) to perform operations. The operations may include receiving a first textual description associated with a situation of a first user. The operations may further include determining a first set of vector embeddings based on the received first textual description. The operations may further include receiving a first set of ethical texts based on a first user-input from a second user different from the first user. The operations may further include determining a second set of vector embeddings based on the received first set of ethical texts. The operations may further include determining a first set of antonym words and a second set of synonym words with respect to the determined first set of vector embeddings, based on the determined second set of vector embeddings. The operations may further include determining a set of sentences based on the determined first set of antonym words and the determined second set of synonym words. The operations may further include selecting a first sentence from the determined set of sentences based on parts-of-speech included in each of the determined set of sentences. The operations may further include generating, by a Generative Adversarial Network (GAN) model, a first image based on the selected first sentence. The operations may further include rendering the generated first image on a display device associated with the second user.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
   receiving a first textual description associated with a situation of a first user;
   determining a first set of vector embeddings based on the received first textual description;
   receiving a first set of ethical texts based on a first user-input from a second user different from the first user;
   determining a second set of vector embeddings based on the received first set of ethical texts;
   determining a first set of antonym words and a second set of synonym words with respect to the determined first set of vector embeddings, based on the determined second set of vector embeddings;
   determining a set of sentences based on the determined first set of antonym words and the determined second set of synonym words;
   selecting a first sentence from the determined set of sentences based on parts-of-speech included in each of the determined set of sentences;
   generating, by a Generative Adversarial Network (GAN) model, a first image based on the selected first sentence; and
   rendering the generated first image on a display device associated with the second user.

2. The method according to claim 1, further comprising:
   receiving information about a first decision made by an Artificial Intelligence (AI) model, the first decision being associated with a first request of the first user;
   receiving, from an explainable AI model corresponding to the AI model, information about a first reason associated with the first decision; and
   receiving information about a first set of ethical conditions on which the AI model is trained to make the first decision,
      wherein the received first textual description includes the received information about the first decision, the received information about the first reason, and the received information about the first set of ethical conditions.

3. The method according to claim 1, wherein the first set of vector embeddings is determined using a one-hot vector-embedding technique.

4. The method according to claim 1, wherein the first set of ethical texts corresponds to one or more of: a set of consequentialism-based ethical texts, a set of deontological-based ethical texts, a set of situational-based ethical texts, a set of subjectivism-based ethical texts, a set of virtue-based ethical texts, a set of intuitionism-based ethical texts, or a set of utilitarian-based ethical texts.

5. The method according to claim 1, further comprising:
   selecting one or more ethical texts from the received first set of ethical texts based on a second user-input from the second user; and
   determining the second set of vector embeddings based on the selected one or more ethical texts.

6. The method according to claim 1, wherein the selected first sentence corresponds to a first ethical condition which is different from a second ethical condition corresponding to the received first textual description.

7. The method according to claim 1, further comprising:
   identifying the parts-of-speech included in each of the determined set of sentences;
   determining a diversity score associated with each of the determined set of sentences based on a count of the identified parts-of-speech included in each of the determined set of sentences; and
   selecting the first sentence from the determined set of sentences based on the determined diversity score associated with each of the determined set of sentences.

8. The method according to claim 1, wherein the selection of the first sentence from the determined set of sentences is further based on a third user-input from the second user.

9. The method according to claim 1, wherein the GAN model corresponds to a zero-shot text-to-image converter model.

10. The method according to claim 1, wherein the generated first image is representative of one or more of: the situation of the first user, a consequence of a decision corresponding to a request of the first user, or a desirable ethical value corresponding to the situation of the first user.

11. One or more non-transitory computer-readable storage media configured to store instructions that, in response to being executed, cause an electronic device to perform operations, the operations comprising:
   receiving a first textual description associated with a situation of a first user;
   determining a first set of vector embeddings based on the received first textual description;
   receiving a first set of ethical texts based on a first user-input from a second user different from the first user;
   determining a second set of vector embeddings based on the received first set of ethical texts;
   determining a first set of antonym words and a second set of synonym words with respect to the determined first set of vector embeddings, based on the determined second set of vector embeddings;

determining a set of sentences based on the determined first set of antonym words and the determined second set of synonym words;

selecting a first sentence from the determined set of sentences based on parts-of-speech included in each of the determined set of sentences;

generating, by a Generative Adversarial Network (GAN) model, a first image based on the selected first sentence; and rendering the generated first image on a display device associated with the second user.

12. The one or more non-transitory computer-readable storage media according to claim 11, wherein the operations further comprise:

receiving information about a first decision made by an Artificial Intelligence (AI) model, the first decision being associated with a first request of the first user;

receiving, from an explainable AI model corresponding to the AI model, information about a first reason associated with the first decision; and receiving information about a first set of ethical conditions on which the AI model is trained to make the first decision, wherein the received first textual description includes the received information about the first decision, the received information about the first reason, and the received information about the first set of ethical conditions.

13. The one or more non-transitory computer-readable storage media according to claim 11, wherein the first set of vector embeddings is determined using a one-hot vector-embedding technique.

14. The one or more non-transitory computer-readable storage media according to claim 11, wherein the first set of ethical texts corresponds to one or more of: a set of consequentialism-based ethical texts, a set of deontological-based ethical texts, a set of situational-based ethical texts, a set of subjectivism-based ethical texts, a set of virtue-based ethical texts, a set of intuitionism-based ethical texts, or a set of utilitarian-based ethical texts.

15. The one or more non-transitory computer-readable storage media according to claim 11, wherein the operations further comprise:

selecting one or more ethical texts from the received first set of ethical texts based on a second user-input from the second user, and determining the second set of vector embeddings based on the selected one or more ethical texts.

16. The one or more non-transitory computer-readable storage media according to claim 11, wherein the selected first sentence corresponds to a first ethical condition which is different from a second ethical condition corresponding to the received first textual description.

17. The one or more non-transitory computer-readable storage media according to claim 11, wherein the operations further comprise:

identifying the parts-of-speech included in each of the determined set of sentences;

determining a diversity score associated with each of the determined set of sentences based on a count of the identified parts-of-speech included in each of the determined set of sentences; and selecting the first sentence from the determined set of sentences based on the determined diversity score associated with each of the determined set of sentences.

18. The one or more non-transitory computer-readable storage media according to claim 11, wherein the GAN model corresponds to a zero-shot text-to-image converter model.

19. The one or more non-transitory computer-readable storage media according to claim 11, wherein the generated first image is representative of one or more of: the situation of the first user, a consequence of a decision corresponding to a request of the first user, or a desirable ethical value corresponding to the situation of the first user.

20. An electronic device, comprising:

a memory storing instructions;

a processor, coupled to the memory, that executes the instructions to perform a process comprising:

receiving a first textual description associated with a situation of a first user;

determining a first set of vector embeddings based on the received first textual description;

receiving a first set of ethical texts based on a first user-input from a second user different from the first user;

determining a second set of vector embeddings based on the received first set of ethical texts;

determining a first set of antonym words and a second set of synonym words with respect to the determined first set of vector embeddings, based on the determined second set of vector embeddings;

determining a set of sentences based on the determined first set of antonym words and the determined second set of synonym words;

selecting a first sentence from the determined set of sentences based on parts-of-speech included in each of the determined set of sentences;

generating, by a Generative Adversarial Network (GAN) model, a first image based on the selected first sentence; and rendering the generated first image on a display device associated with the second user.

* * * * *